United States Patent [19]

Noguchi

[11] 3,918,571
[45] Nov. 11, 1975

[54] APPARATUS FOR SUPPLYING EGGS AND THE LIKE

[76] Inventor: Hikoji Noguchi, No. 2605-19 Oaza-Mikajima, Tokorozawa-shi, Saitama-ken, Japan

[22] Filed: Mar. 15, 1974

[21] Appl. No.: 451,698

[52] U.S. Cl. .................. 198/25; 198/183; 198/237
[51] Int. Cl.² ........................................ B65G 47/00
[58] Field of Search ......... 198/20 R, 25, 26, 29, 30, 198/31 R, 31 AC, 103, 127 R, 181, 183, 209, 257–260, 263, 266, 237, 238, 240

[56] References Cited
UNITED STATES PATENTS

| | | | |
|---|---|---|---|
| 2,762,496 | 9/1956 | McCaul | 198/181 |
| 2,821,157 | 1/1958 | Boyd | 198/209 |
| 2,933,174 | 4/1960 | Hait et al. | 198/260 |
| 2,962,849 | 12/1960 | Layton | 198/31 AC |
| 3,471,000 | 10/1969 | Bodolay et al. | 198/30 |
| 3,543,908 | 12/1970 | Holland | 198/30 |
| 3,638,778 | 2/1972 | Remensperger | 198/31 AC |

*Primary Examiner*—James B. Marberi
*Assistant Examiner*—Joseph E. Valenza
*Attorney, Agent, or Firm*—Browdy & Neimark

[57] ABSTRACT

An apparatus for supplying the eggs in an orderly manner from the battery or the like facilities to the packaging station. A number of support rolls are provided in a circle so as to rotate about the center of the circle and also about their own axes, each roller having a diameter which increases towards the outer side of the circle and are designed to receive each one egg in the interstices defined between the adjoining rolls. The eggs are supplied consecutively from the supply gate to the rolls and thence to the packaging station by way of one or a plurality of egg paths each adapted to convey the eggs in a row. The supply gate is opened to a rather broad extent so that the eggs may be conveyed therefrom to the rolls without the danger of clogging the passage and retarding the flow of eggs.

4 Claims, 10 Drawing Figures

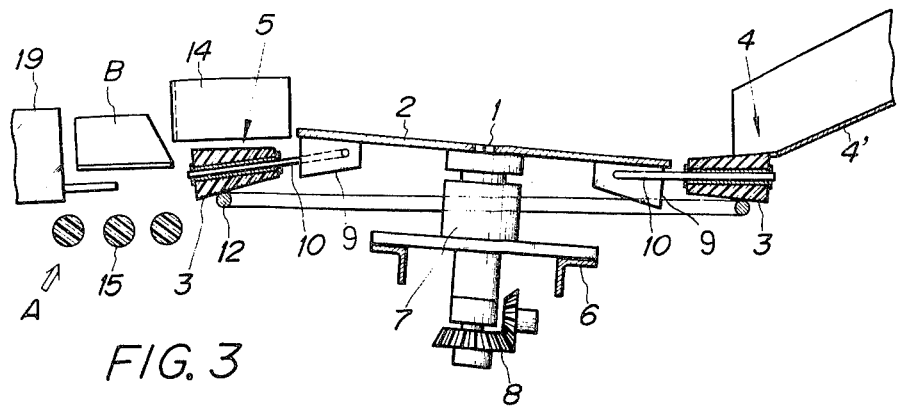
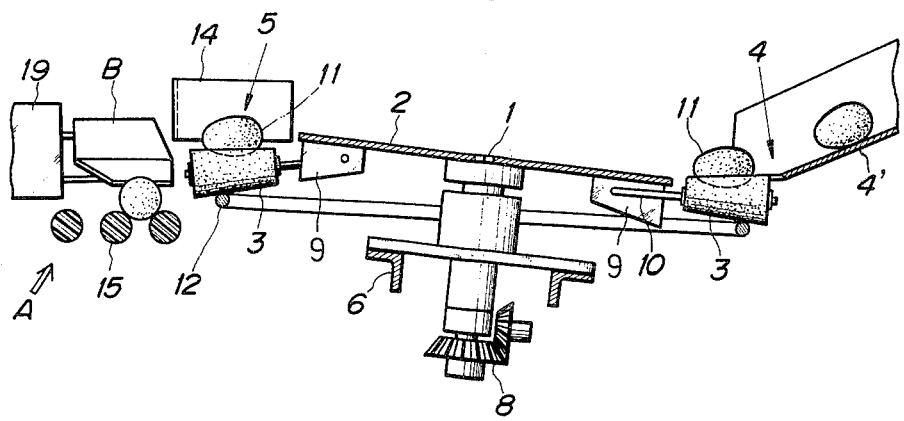
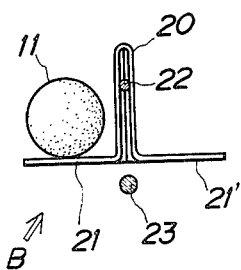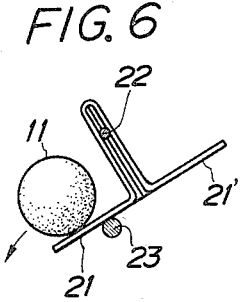

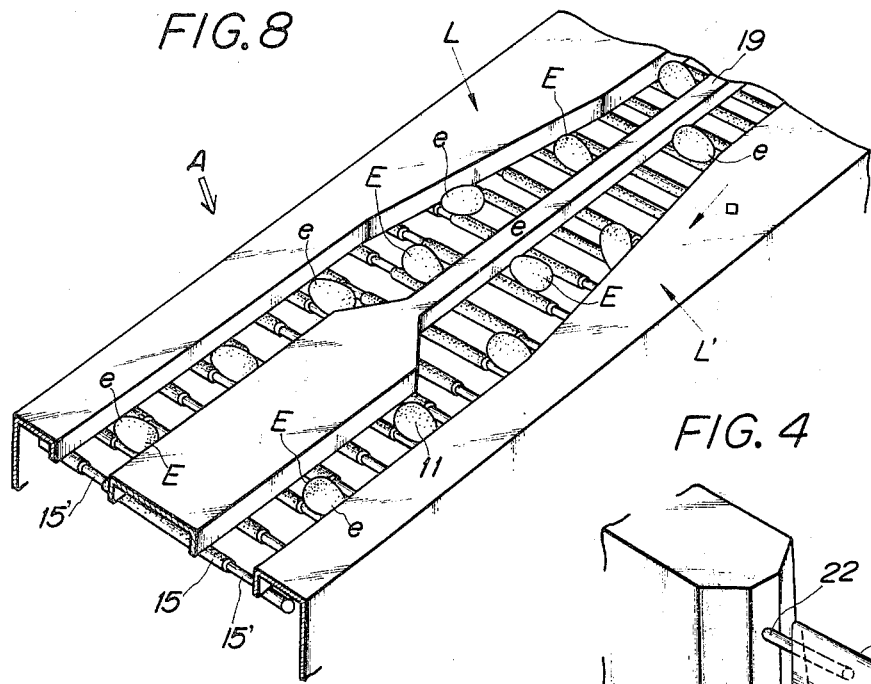
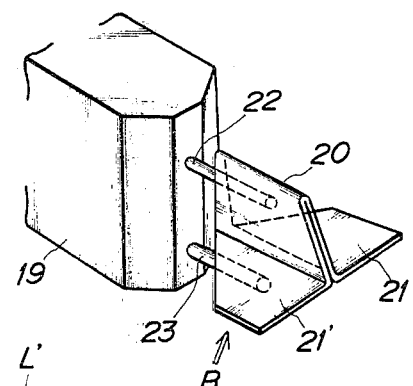
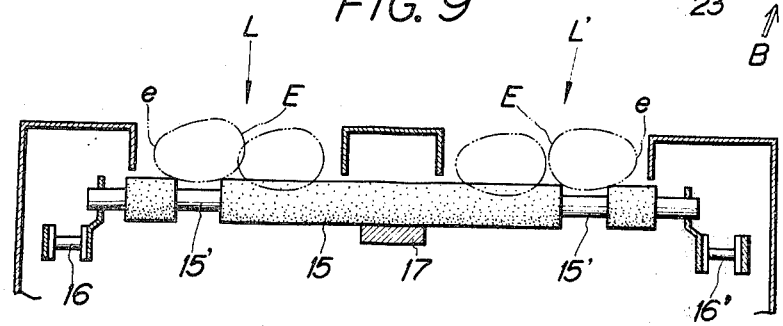

APPARATUS FOR SUPPLYING EGGS AND THE LIKE

This invention relates to an apparatus for supplying eggs or similar spherical objects smoothly and automatically in one or a plurality of supply lines without the danger of clogging the passage and thereby retarding the flow of eggs.

In the packaging operation, ten eggs, for instance, are usually charged into one egg package. If desired to automate this packaging process, it could be conceived very readily to supply a number of eggs on a conveying or supply table so that the eggs will roll therealong and be aligned automatically in a single line, or plurality of lines, so as to be charged into a package in a good order.

This conception was known heretofore and various devices of this kind have so far been proposed. However, these devices were accompanied with some deficiencies which were highly annoying to their users.

Reference is now made to FIG. 10 for explanation of such deficiencies.

In FIG. 10 showing the supply station of a typical device of the above kind in a plan view, the reference letters $a$, $b$ denote the passages for each egg supply line and the reference letter $c$ denotes the conveying table to which the eggs from the battery and the like facilities are supplied consecutively. In FIG. 10, the supply side $h$ is usually elevated, and eggs are placed on the supply table $c$ and roll by their gravity to be delivered in the direction as schematized by the arrow.

The egg passages are made narrow at their entrance point $g$ so that each one egg may be introduced into each of the egg passages. However, the egg passages may sometimes be clogged by the two eggs being forced to flow thereinto concurrently as schematized at $d\ d$ in FIG. 10. The eggs are introduced usually one by one in a good order as indicated by $f, f, f$, but the two eggs may be forced at a time into one egg passage on some occasions through the narrowed entrance point $g$ in the manner described above, thus resulting in the retarded egg flow and the abovementioned deficiency.

This deficiency represents in effect a serious problem such that the eggs may be erected upright on the conveying table and even be ruptured. To prevent this phenomenon, some operators must be always present in a near-by position.

In this consideration, the present invention provides a novel apparatus for conveying the eggs positively and one by one in the well controlled posture of transport so that they can be packaged smoothly and automatically by the following packaging operation.

This invention will now be described in detail with reference to the accompanying drawings, in which FIG. 1 is a plan view of the inventive apparatus;

FIG. 2 is a longitudinal section of the same;

FIG. 3 is an explanatory view of the apparatus of FIG. 2 in its operative state;

FIG. 4 is a perspective view of a unit for dividing the egg flow;

FIG. 5 to 7 are the explanatory view of the operation of the dividing unit;

FIG. 8 is a perspective view of the egg paths;

FIG. 9 is longitudinal section of the egg path; and

Figure 1:
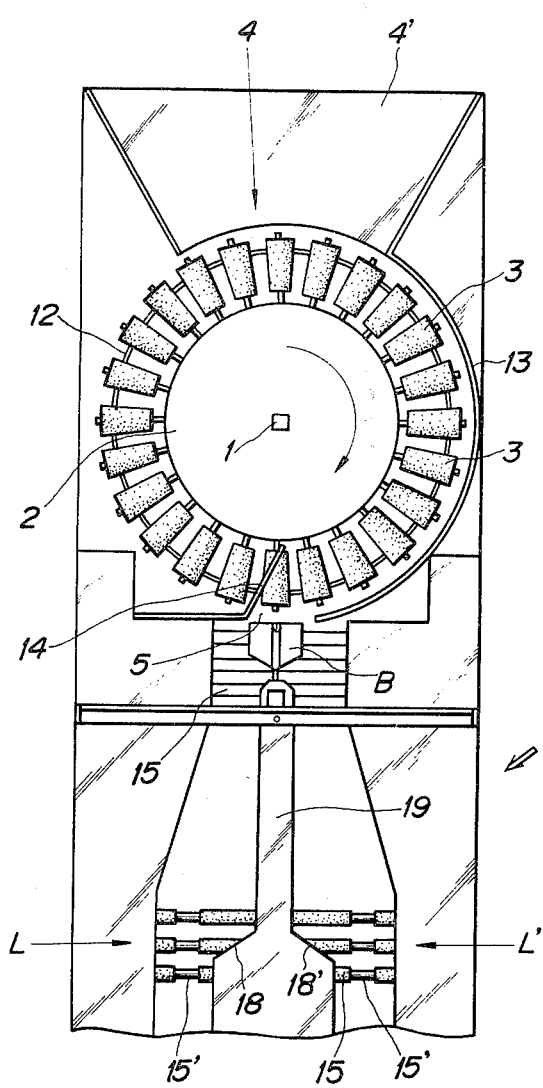

Referring to FIG. 2, a rotary shaft 1 is mounted vertically by a bearing 7 secured to brackets 6. A rotary disc 2 is secured to the top of the rotary shaft 1 carrying the drive gear means 8. A number of radial support plates 9 are mounted to the lower peripheral portion of the rotary disc 2. A rod 10 is secured at its end part to each said support plate 9 so as to be pivoted vertically. These rods 10 are mounted to project radially from the periphery of the disc 2 and a support roll 3 is rotatably fitted to each said rod 10. The support roll 3 has a frustoconical shape when seen in a top plan view and has its diameter increasing gradually radially from the inner to the outer portion.

These support rolls 3 are arranged so as to define the interstices or gaps therebetween each designed for carrying one egg 11.

The numeral 4 designates a supply gate for the eggs 11 having an inclined bottom plate 4' and having a broad opening range so that five eggs, for instance, may be delivered at a time into the five interstices formed between the adjoining support rolls 3. An egg delivery or discharge gate 5 is provided opposite to the supply gate 4 so that only one egg may be discharged therethrough at a time.

A ring 12 is provided on the lower surface of the rolls 3 so that the latter may be rotated about their axes by direct contact with the ring.

In the embodiment shown in FIGS. 2 and 3, and 3, the support rollers 3 adapted to roll along the ring 12 are disposed so that the upper surfaces of the rolls 3 rolling on the ring 12 will define a horizontal surface in a semicircular zone from the supply gate 4 to the discharge gate 5.

Preferably the support rollers 3 are so designed that they will continue to rotate about their axes until they reach the position right ahead of the discharge gate 5. A guard wall 13 is provided in a semicircular path along the outer side of the support rolls 3.

A guide plate 14 is mounted at the discharge gate 5 at an angle with respect to the delivery direction of the eggs and on top of the support rolls 3 so that the eggs may be conveyed out of the semicircular passage of the support rolls 3. To the discharge gate 5 is provided an adjustment unit A comprising for instance two passages L, L and adapted for adjusting the posture of the eggs in such manner that the blunt ends E and the acute ends $e$ of the eggs 11 may be directed in the same sense, although the precise construction and operation of the unit A have not been shown in the present specification as they belong to the prior art. In FIG. 1 showing an embodiment of the invention comprising two egg passages L, L', a number of the rolls 15 are mounted in parallel with the gaps between the adjoining rolls 15 adapted to receive each one egg 11 and a contact plate 17 (FIG. 9) is mounted to contact with the lower sides of the rolls 15, so that the latter may be rotated about their axes by frictional contact with the contact plate 17 as the rolls 15 are moved by operation of the chains 16, 16'. Each said egg passage L, or L' has a reversing surface 18, or 18', and each said roll 15 has an intermediate reduced diameter portion which serves as an egg seat 15.

A dividing wall 19 (FIG. 8) for defining the egg passages L, L' is provided at the entrance point of the adjustment unit A, and a dividing member B is provided at the inner end part of the wall 19 so as to be pivotable about 180° in the left and right directions.

The dividing member B has a inverted shape of a letter T in a front view and comprises a longitudinal section 20 connected to two transverse sections 21, 21'. A rod 22 secured to the section 20 is mounted rotatably to the foremost part of the wall 19 which also carries a stop bar 23 projecting in a parallel relation with said rod 22, so that the member B may be swung 180° in either directions under the impact force of the oncoming eggs, as will be more fully explained hereinbelow.

The terminal end parts of the egg paths L, L' of the adjustment unit A are connected to a further transport unit, not shown, so that the eggs may be received into the recesses of the egg packages and covered with the top covers for readying to be offered to the market.

Figure 10:
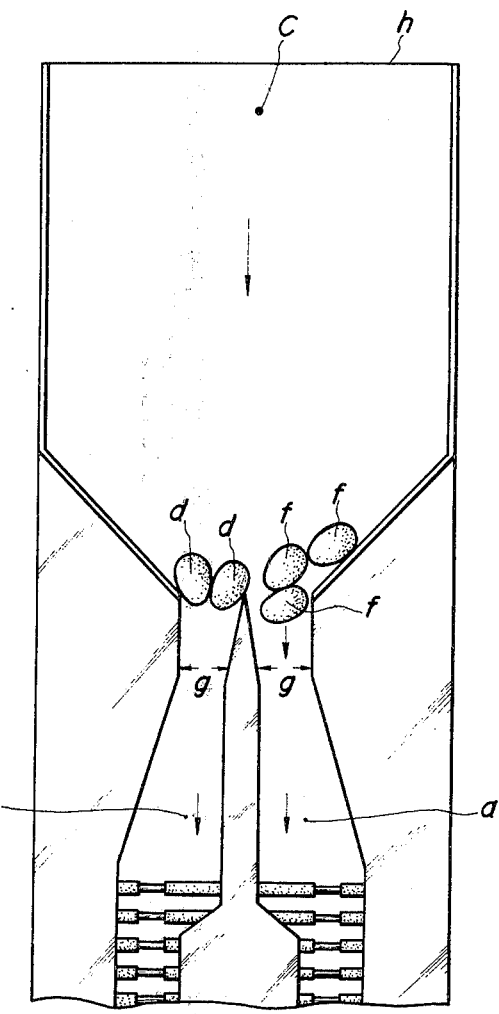
FIG. 10 shows a typical prior art device in a plan view.

The operation of the above apparatus is as follows:

When the gear means 8 is actuated by an electric motor, not shown, for driving the shaft 1 in rotation, the disc 2 is rotated in unison with the support rollers 3. Since the rollers 3 are contacted frictionally on their lower surfaces with the ring 12, the rollers 3 are rotated with the shaft 1 as center and also about their axes. When a number of eggs are placed on the inclined bottom plate 4', the eggs are delivered towards the supply gate 4 by their own gravity and are received in the respective gaps intermediate the adjoining rolls 3. Since the gate 4 has a broader opening range, as shown in FIG. 1, than that of the prior art apparatus such as shown in FIG. 10, the eggs may be received in the above-mentioned gaps positively and consecutively, even supposing that the eggs have been supplied thereto in an exceedingly large number and in any posture of transport. The rolls 3 are rotated about the common shaft 1 and about their own axes, as above described, and the eggs placed on the rolls 3 are also rotated on the rollers along a semicircular path about said shaft 1 at the same time that they are rotated about their own axes. Since the rolls are gradually increased in their diameters towards the radially outer portion, the eggs are forced to be shifted permanently towards the outer portion until they abut on the peripheral guard 13. The eggs are conveyed in this state and finally delivered to the discharge gate 5. Since the guard wall 13 terminates at the gate 5, the eggs are discharged naturally therefrom and introduced into the branched paths L, L' of the unit A. The eggs which would proceed along the circular path by inertia will abut on the guide plate 14 and thereby be discharged out of the circular path of the support rolls 3.

The eggs thus discharged through the discharge gate 5 are directed into the left and right egg paths L, L'. This operation is taken charge of by the above-mentioned dividing member B. The eggs which have reached the left-hand side roll 3 in FIG. 3 and are discharged therefrom towards the left, the eggs are received by the transverse sections 21 or 21' of the dividing member B, shown in FIG. 4. FIG. 5 shows the egg being received by the left-hand side section 21. The dividing member B is pivoted towards the left with the rod 22 as center under the weight of the egg until the section 21 abuts on and is stopped by the stop bar 23. The egg 11 is rolled down from the member B into the left-hand side egg path as shown in FIG. 1. As the egg 11 is rolled down and moved out of the dividing member B, a new egg is supplied from the discharge gate. Since the dividing member B is inclined at this time as shown in FIG. 6, the new egg is naturally received by the transverse section 21' and introduced into the right hand egg path as shown schematicaly in FIG. 7.

According to this invention, the supply gate 4 of the bottom plate 4' serving as a supply table is not opened directly into the respective egg paths L, L' as in the prior art devices, and a number of support rolls 3 are arranged to rotated along a circular passage intermediate the entrance point of the egg paths L, L' and the supply gate 4 of the bottom plate 4'. Hence, the support rolls 3 are moved obliquely relative to the proceeding direction of the eggs supplied from the gate 4, and the eggs are received by one by one in an orderly manner between the adjoining rolls 3, although the gate 4 has a rather broad extent as schematically indicated in FIG. 1. Thus, the clogging of the supply gate 4 may always be prevented even when a exceedingly large number of eggs have been placed on the bottom plate 4'.

Moreover, since the diameter of each roll 3 is adapted to be increased towards the outer sides, and each roll 3 performs an axial rotation as it follows a circular path about the pivot shaft 1, the eggs may be shifted towards the radially outer portion on the support rolls 3 and discharged positively to the outside by way of the discharge gate 5.

In addition, since each roll 3 has the frustoconical shape and the egg is pressed towards the guard rail as it is conveyed along the semicircular passage, the inner disc 2 may be used conceveniently so that several non-broken eggs may be placed on the disc surface so as to be used by an operator to manually replace broken eggs which may be discovered occasionally in the course of the conveying procedure.

Although the apparatus described in the foregoing is provided with two egg paths and the dividing member B associated therewith, the present invention may be performed so that only one egg path is provided and the eggs may be supplied unanimonsly from the discharge gate to this egg path.

What is claimed is:

1. An apparatus for automatically transferring substantially spherical objects from a spherical object supply gate to the entrance point of at least one spherical object path conveying means for conveying spherical objects in a row, comprising:
   a mounting member rotatably mounted on an axis intermediate the spherical object gate and the entrance point;
   a plurality of support rolls;
   a plurality of support rods, each of said rods radially extending from said mounting member and pivotably mounted on said mounting member and each of said support rods being rotatably connected to a separate support roll such that each of said plurality of support rolls is rotatable about the longitudinal axis thereof;
   each of said support rolls being of frusto-conical configuration and having a diameter increasing with distance from said mounting member;
   means for rotating said mounting member; and
   means for rotating said support rolls about the longitudinal axis thereof.

2. Apparatus as claimed in claim 1, in which a guard wall is provided at least semicircularly around the outer periphery of said support rolls between the supply gate and the entrance point in the direction of rotation of said mounting member.

3. Apparatus as claimed in claim 1, in which a plurality of spherical object path conveying means are provided and are separated by a dividing wall, and wherein dividing means are provided at the entrance point to provide spherical objects successively to each of the plurality of spherical object path conveying means.

4. Apparatus as claimed in claim 1, in which said means for rotating said support rolls includes a ring fixedly mounted below said support rolls and in frictional contact with said rolls thereby causing said support rolls to rotate when said mounting member rotates.

* * * * *